Figure 2:
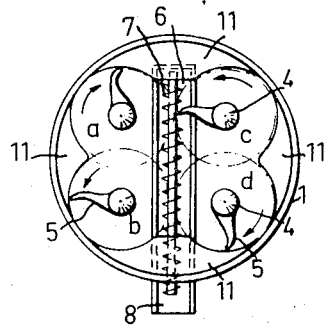

United States Patent [19]
Wennberg

[11] 3,823,837
[45] July 16, 1974

[54] DEVICE FOR DISCHARGING BULK MASSES FROM A STORAGE CONTAINER

[76] Inventor: Olov Carl Gustav Wennberg, Champ du Vert Chasseur 16, B-1180 Brussels, Belgium

[22] Filed: Feb. 1, 1973

[21] Appl. No.: 328,603

[30] Foreign Application Priority Data
Feb. 14, 1972  Sweden.............................. 1719/72

[52] U.S. Cl................ 214/17 D, 222/238, 222/410
[51] Int. Cl............................................ B65g 65/48
[58] Field of Search...... 214/17 D, 17 DA; 222/238, 222/271, 272, 410

[56] References Cited
UNITED STATES PATENTS
3,225,713  12/1965  Kruse.................................. 222/410
FOREIGN PATENTS OR APPLICATIONS
1,087,080  8/1960  Germany......................... 214/17 D Primary Examiner—Robert G. Sheridan
Attorney, Agent, or Firm—Young and Thompson

[57] ABSTRACT

This invention relates to a device for discharging material, especially sticky material having a tendency to bridging from a storage container, especially a silo with a bottom of circular or rectangular shape having one or more flutes or openings through which the goods are discharged. The invention refers especially to discharging devices having scraper wings mounted on rotatable shafts and arranged to sweep circular surface portions or the surface of the bottom of the container. The invention consists in that a plurality of shafts with scraper wings are arranged so that the surface portions of the bottom swept by each wing have their peripheries passing very near each other, touching each other or intersecting each other, said peripheries passing either very near or touching the outer contour of the container bottom. The sweeping fields of the wings also extend to or over the edge of one or more discharge openings or discharge flutes in the bottom, said flutes containing feed members such as conveyor screws to feed the material falling or being swept down into the flute to a discharge end thereof. Filler bodies covering the non-swept surface portions of the bottom have guide surfaces inclined downwards and inwards from the container wall towards the bottom.

5 Claims, 7 Drawing Figures

PATENTED JUL 16 1974 3,823,837

DEVICE FOR DISCHARGING BULK MASSES FROM A STORAGE CONTAINER

It is known to mount agitators at the bottom of silos in order to facilitate the discharge of the silo material into a discharge flute with a conveyor screw, so that the discharge can be effected as far as possible without bridging and irregularities in the discharging process. In larger storage containers it has shown inconvenient to provide one single agitator journalled centrally in the bottom of the container, since the loads on the agitator become very heavy, especially if the arms of the agitator must be made so long, that they reach the periphery of the container bottom.

This invention, which in the first place is concerned with the discharge of easily agglomerating materials such as crushed soya beans, wood chips and similar masses, has for its purpose to eliminate the above stated disadvantages and to permit an easy and even discharge without bridging of the goods from a container even with such materials, which are difficult to feed. According to the invention this is essentially achieved by mounting scraper wings individually on separate, rotatable shafts in such manner, that these wings, upon rotation of the shafts, sweep circular portions of the bottom surface of the container, the peripheries of these circular surfaces touching or intersecting or passing very near each other, and touching or nearly touching the periphery of the bottom, so that a major portion of the bottom surface is swept by the wings, the sweeping range of which also extends to or over one or more discharge flutes in the container bottom containing conveyor means such as conveyor screws, or one or more discharge openings in said bottom.

In order to prevent goods from remaining on such portions of the bottom surface which are not swept by the scraper wings, these portions can be covered by filler bodies having surfaces facing in inwards to the interior of the container and sloping from the container wall inwards and downwards, said bodies also having their lower edges shaped according to the contours of the swept bottom surface portions.

The invention has the advantage of permitting an effective discharge from cylindrical storage containers of all sizes and also from containers having rectangular or polygonal bottom surfaces.

Figure 1:
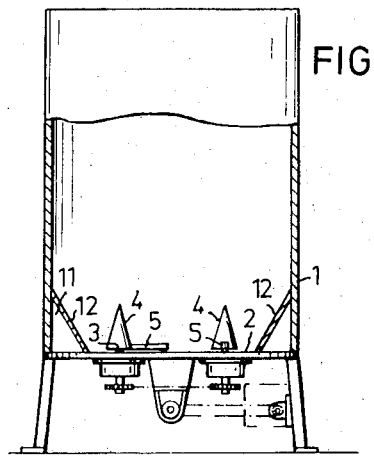
Figure 4:
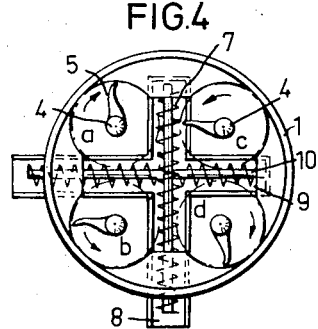
Figure 3:
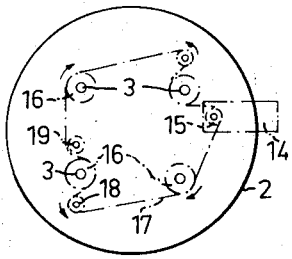

Some embodiments of the invention will now be described with reference to the accompanying drawing, in which FIG. 1 shows a vertical section through the lower portion of a silo, FIG. 2 a corresponding plan view of the silo bottom, FIG. 3 a diagrammatical view from above of the silo bottom showing the principles of chain or belt driving means forming part of the discharge device, FIG. 4 a modification of the device according to FIG. 2 having two discharge flutes, FIG. 5 a plan view corresponding to FIGS. 2, 3 and 4 showing the bottom of a cylindrical storage container with a central discharge opening without any screws, FIG. 6 a plan view of the rectangular bottom of a large container illustrating how the device can be adapted to very large units, and FIG. 7 a fragmentary side cross-sectional view on an enlarged scale of a scraper wing with its drive transmission members mounted in the bottom of the container.

In the drawing 1 is the usually vertical wall of a silo or other storage container with a circular or polygonal bottom 2. This is traversed by a number of shafts 3 having conical hubs 4 at their upper ends. These hubs support scraper wings 5, preferably one wing on each hub. The wings can have an arcuate form so that they present a concave surface in the direction of their rotation (marked by arrows). In the case of a container with a circular bottom and four shafts the shafts with the hubs 4 are so positioned relative to each other, that they form the corners of a square. The circular surface portions $a$, $b$, $c$ and $d$ swept by the wings have their peripheries touching or intersecting each other and reaching over one or more flutes having conveyor screws for feeding out the material falling or being swept down into the flutes. According to the embodiment shown in FIG. 2 there is one flute extending symmetrically between pairs of circular surface portions $a$, $b$ and $c$, $d$, respectively. A conveyor screw 7 extends longitudinally of the flute 6 so as to feed the material along the flute to its discharge end 8. In the embodiment shown in FIG. 4 there is besides the flute 6 with the screw 7 a second flute 9 crossing the flute 6 and containing a conveyor screw 10 at a lower level than the conveyor screw 6. The surface portions situated near the border of the bottom and between the swept surface portions $a$, $b$, $c$, $d$, i.e., the surface portions not reached by the scraper wings are covered by filler bodies 11, the upper surfaces of which are sloping downwards and inwards from the container wall so that the material in the container is forced to slide down onto said surface portions.

Adjacent shafts 3 with their hubs 4 are rotated in opposite directions, which can be achieved by a belt or chain drive diagrammatically indicated in FIG. 3, where 14 shows a motor with a reduction gear, 15 a cog wheel on the output shaft, 16 a chain wheel or belt wheel on shaft 3 and 17 a chain or belt running over the wheels 15 and 16. By means of pulleys 18 and 19 on either side of each second wheel 16 the chain or belt 17 is brought to pass alternately on the outside and inside of successive wheels 16 to rotate successive shafts 3 in opposite directions.

Figure 6:
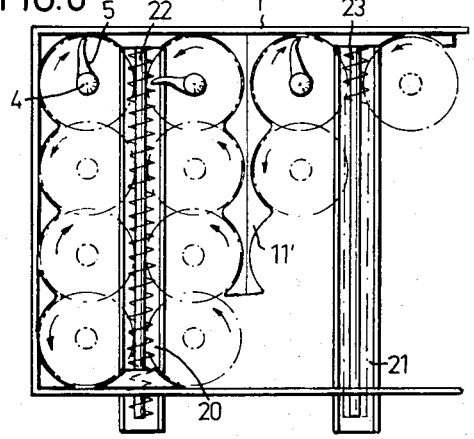

FIG. 6 illustrates how an effective discharge also can be obtained in storage containers with large rectangular bottoms. The shafts 3 and hubs 4 with wings 5 are arranged in parallel rows and each pair of rows feeds material into flutes 20, 21 situated between the flutes of each pair and containing conveyor screws 22, 23 for feeding the goods towards one end of the flute. Filler bodies 11' are provided between the rows having no flute between them.

Figure 5:
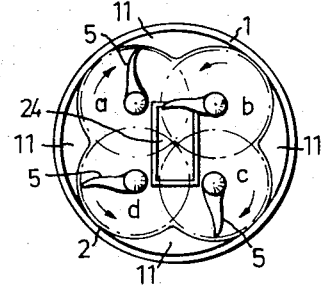

Conveyor screws are not necessary if the conditions are such that the discharge can be effected through the container bottom 2, as shown in FIG. 5. In this embodiment, there is one bottom opening 24, and the circular surface portions $a,b,c,d$ swept by the wings 5 overlap each other and the opening 24, so that they can sweep the goods into the opening in an effective manner. Filler bodies 11 are provided as in the embodiment shown in FIGS. 1 and 2. The driving mechanism for the shafts 3 can also be constructed according to the same principle as indicated in FIG. 3.

Figure 7:
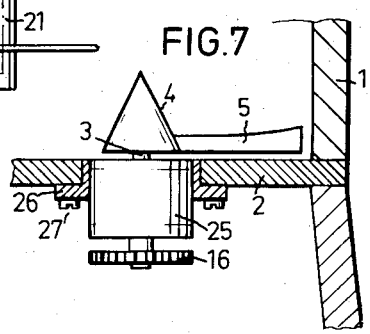

The shafts 3 with their hubs 4 and wings 5 are preferably supported in individual bearing casings 25, which are removably fixed in openings in the bottom of the container, as shown in FIG. 7. The bearing casing 25 has a flange 26 which is fastened to the underside of the bottom 2 by means of screws 27. The opening receiving the bearing casing is so large, that the casing together with the shaft 3 and the wing 5 can be taken out downwards after removing the screws. This it possible to perform repairs on a container without removing the material therein.

What I claim is:

1. A storage container for bulk material, said container having a bottom, a plurality of scraper wings, individual shafts on which said scraper wings are mounted to sweep over circular surface portions of said bottom, means to rotate said shafts, the peripheries of said surface portions being contiguous to each other and to the edges of said bottom so that a major portion of the upper surface of the bottom is swept by said wings, discharge means for discharging material from said container, said scraper wings sweeping over said discharge means, and filler bodies occupying portions of said bottom surface which are not swept by said wings, said filler bodies having surfaces that slope downwardly and inwardly to said bottom and that terminate downwardly in circular edges complementary to said circular surface portions of the container bottom.

2. A device as claimed in claim 1, there being at least four said shafts with each shaft rotating in a direction opposite to each of the immediately adjacent said shafts.

3. A device as claimed in claim 1, and drive means interconnecting said shafts to rotate said shafts in opposite directions to each other.

4. A device as claimed in claim 1, and means supporting said shafts in separate bearing assemblies removably fastened in openings in said bottom so that each said shaft and the associated said wing can be removed through said opening.

5. A device as claimed in claim 1, said shafts being arranged in pairs in parallel rows with discharge flutes between said rows.

* * * * *